United States Patent [19]

Mason et al.

[11] 4,392,660

[45] Jul. 12, 1983

[54] SAFETY BAR

[76] Inventors: James V. Mason, Rte. 1 Box 370; Mancil C. Fisher, Rte. 1, both of Lake Toxaway, N.C. 28747

[21] Appl. No.: 182,505

[22] Filed: Aug. 29, 1980

[51] Int. Cl.³ .......................... B60N 5/00; B60R 21/10
[52] U.S. Cl. .................................... 280/751; 49/385; 105/440; 182/113
[58] Field of Search ............... 280/748, 751, 750, 749; 49/56, 57, 385, 386; 16/112; 105/439, 440, 441, 442; 296/71, 56; 182/112, 113, 97

[56] References Cited

U.S. PATENT DOCUMENTS

| | | | |
|---|---|---|---|
| 526,214 | 9/1894 | Black | 105/440 |
| 534,674 | 2/1895 | Schwarzmiller | 280/748 |
| 683,510 | 10/1901 | Smith | 105/440 |
| 1,148,820 | 8/1915 | Beck | 49/56 |
| 1,207,920 | 12/1916 | Howe | 49/56 |
| 1,405,309 | 1/1922 | Matthews | 280/748 |
| 1,596,795 | 8/1926 | Blakeney | 280/748 |
| 2,263,698 | 11/1941 | Hodgson | 280/748 |
| 2,592,879 | 4/1952 | Eyerly | 280/748 |
| 2,674,486 | 4/1954 | Alderfer | 280/748 |
| 2,767,494 | 10/1956 | Peterson | 49/385 |
| 2,793,069 | 5/1957 | Bixler et al. | 49/385 |
| 2,923,559 | 2/1960 | Owens | 280/748 |
| 3,232,376 | 2/1966 | Lucas et al. | 182/113 |
| 3,282,604 | 11/1966 | Goldberg | 280/748 |
| 3,520,571 | 7/1970 | Rogers | 280/748 |
| 3,737,192 | 6/1973 | Hirsh | 296/190 |
| 4,041,646 | 8/1977 | Mittag | 49/385 |

Primary Examiner—David M. Mitchell
Attorney, Agent, or Firm—Berman, Aisenberg & Platt

[57] ABSTRACT

The invention is a safety bar for use in the cab of large earth moving equipment and which extends across the entryway of the cab. The safety bar is pivotally connected to the floor and has vertical freedom of rotation across the entryway. When in place across the entryway, the safety bar has a horizontal member connected to a vertical support member. The vertical member is attached to a hinge base plate adapted to allow vertical freedom of rotation. A latch is provided on the horizontal member to secure the horizontal member to a latch bar to block the entryway.

8 Claims, 6 Drawing Figures

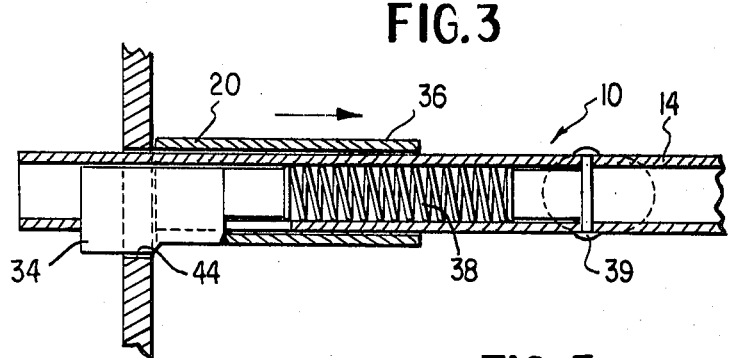
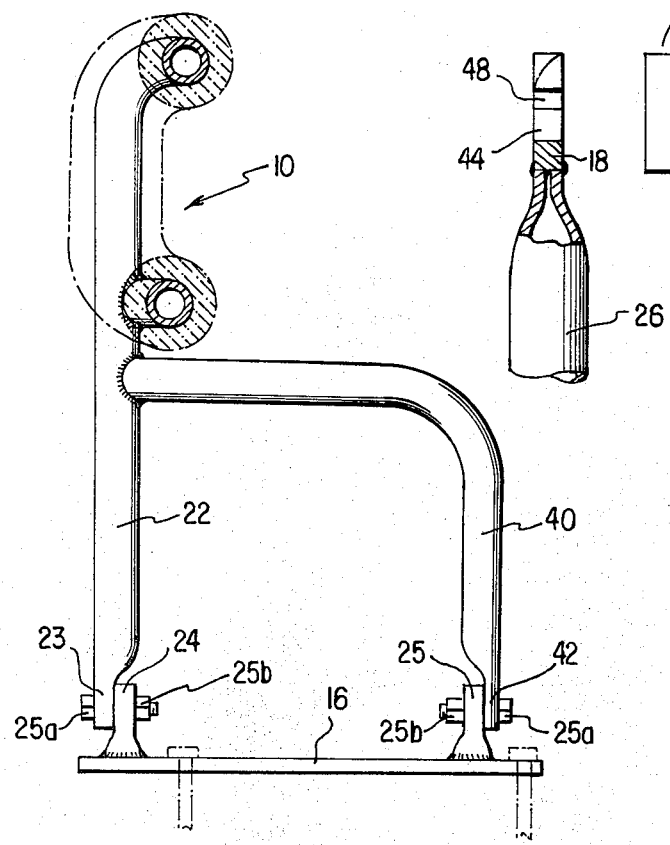
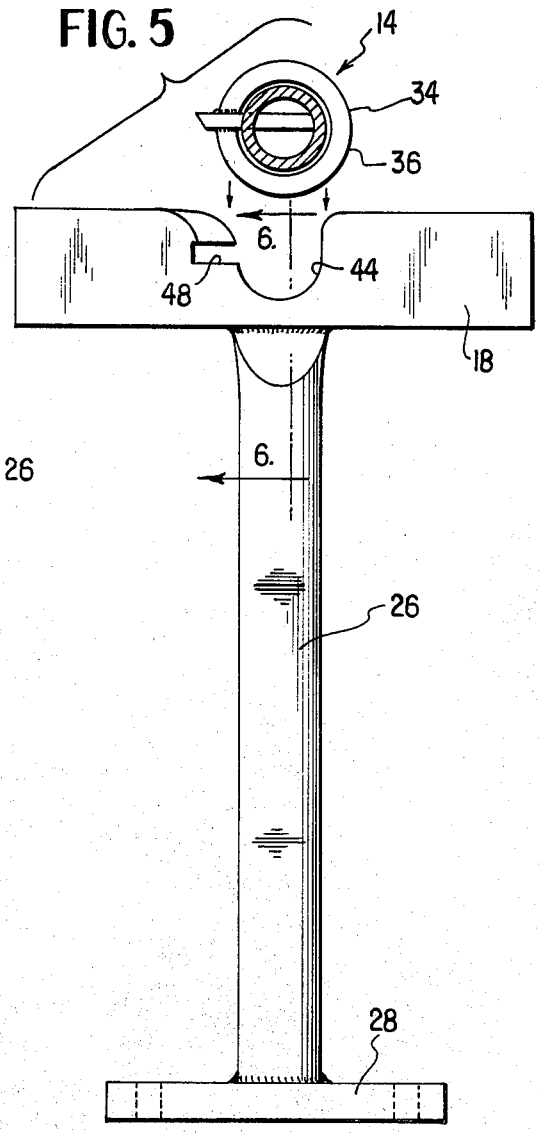

SAFETY BAR

FIELD OF THE INVENTION

The invention relates to a safety bar, and more particularly to a safety bar for use in the cabs of large earth moving equipment.

BACKGROUND OF THE INVENTION

Large earth moving or grading equipment commonly has an enclosed cab having a dashboard containing controls and a driver's seat so that the driver may sit while in the driving position. During use of this equipment in hot weather, the driver commonly leaves the door open to allow air to circulate inside the cab to maintain the cab at a comfortable temperature. The driver is often in a standing position inside the cab so that he may see over the dash to perform the duties required of him and observe the field of action during grading or earth moving. As a result, the driver is exposed to the danger of falling out of the cab through the open door.

The prior art shows various assorted apparatuses to bar entry by an individual into hazardous areas. In U.S. Pat. No. 1,207,920 issued to A. Howe there is taught an apparatus that is pivotally connected to a wall and has a single bar member which can be rotated downward to bar passage of an individual into an unsafe area adjacent a passageway.

U.S. Pat. No. 1,405,309 issued to A. E. Matthews, U.S. Pat. No. 2,592,879 issued to L. U. Eyerly and U.S. Pat. No. 2,674,486 issued to S. W. Alderfer show various substantially solid retainer bars to retain a passenger in a vehicle seat during movement. In U.S. Pat. No. 3,282,604 issued to A. G. Goldberg is shown a solid retaining bar which bridges a passenger area and prevents movement laterally on the seat which is provided with means to adjust such restraint to accept a particular seat structure. Further, U.S. Pat. No. 3,737,192 issued to Hirsch teaches the provision of fixed handrails along walking passageways on earth moving equipment to provide handholds for individuals walking on the equipment to steady their walk.

In U.S. Pat. No. 1,596,795 issued to J. T. Blakeney is shown a series of adjustable horizontal bars which attach to the side walls of an automobile to keep children in the back seat passenger area of the automobile. In U.S. Pat. No. 2,793,069 is taught the structure of a pivotal type vehicle cab door having a lock bar which locks the door closed during operation to prevent accidental opening of the door.

The prior art provides many various apparatus to restrain the movement of individuals inside enclosures of moving vehicles, but none are known to the inventors which satisfactorily solve the problem of operators of these vehicles. Operators often have to stand in cabs in order to be able to properly see the terrain in front of the vehicle and often leave the door of the vehicle cab open to allow air circulation within the vehicle. As the operator is standing, seat restraints are unsatisfactory as he must be able to see over the dash to properly operate the equipment. Furthermore, none of the apparatus known in the prior art provides an apparatus to allow the operator to safely stand in the cab during vehicle operation with the door open to allow air circulation.

SUMMARY OF THE INVENTION

It is a primary object of this invention to provide an apparatus which can be operated by the operator of equipment having an enclosed cab which will retain him inside during operation and yet allow him to open the doors to enhance his listening or to permit air circulation in the cab.

It is another object of the present invention to provide a safety bar which will not limit movement within the cab itself but will prevent accidental expulsion of the operator from the cab of the operated equipment.

It is a further object of the current invention to provide an apparatus which may be easily rotated out of the entryway in such a cab to allow quick exit therefrom.

The above objects are achieved by the invention which, in a preferred embodiment, includes a hinged plate member attached to the floor, a safety bar having a horizontal bridging member bridging the entryway to the cab and having a means for latching. A vertical support member rigidly connects the horizontal member to the hinged plate. The hinged plate is adapted to provide the safety bar with vertical freedom of rotation about the hinge point to allow it to be rotated from a vertical position and across the entryway to a cab. A latch bar is provided which engages the means for latching to hold the safety bar in place.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the specific embodiment, when read in connection with the accompanying drawings, wherein like reference characters indicate like parts throughout the several figures, and in which:

FIG. 3 is a side cross-sectional view of a latch means of the safety bar taken along section lines 3—3 of FIG. 2;

FIG. 4 is a front view of the safety bar taken along section lines 4—4 of FIG. 2;

FIG. 5 is a sectional view of the safety bar and latch bar taken along section lines 5—5 of FIG. 2 but showing the safety bar descending into the latching position; and FIG. 6 is a side cross-sectional view of the latch bar taken along section lines 6—6 of FIG. 5.

DETAILED DESCRIPTION OF THE INVENTION

Figure 1:
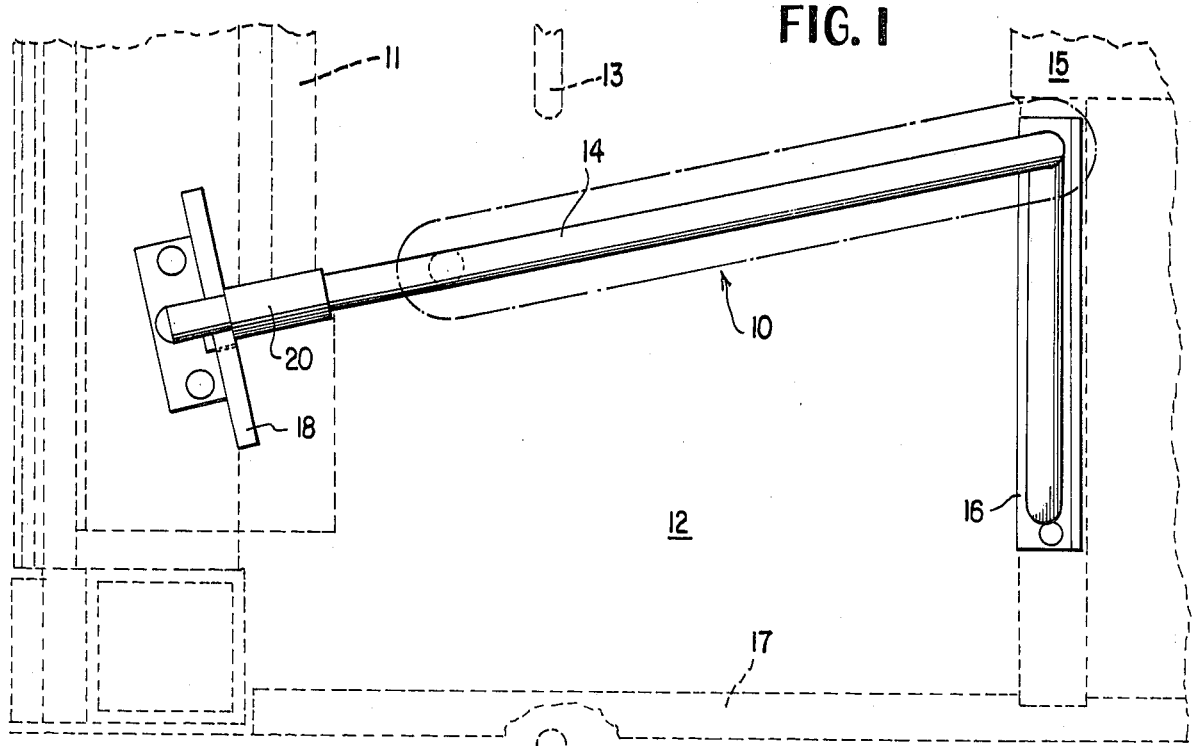
FIG. 1 is a plan view of a safety bar in locking position across the door of a cab.

The invention that is the subject of this application can be seen in a top plan view in FIG. 1 in a latched position. The safety bar 10 is mounted in cab 12 of a vehicle. Shown in dashed lines are the components of cab 12. Steering wheel 13 is mounted in dashboard 11 and seat 15 is positioned to allow the driver of the vehicle to sit and operate the vehicle. Cab door 17 allows entrance to the cab 12 through the cab entryway. Safety bar 10 has a horizontal member 14, a base hinged plate 16, a latch bar 18 and a safety latch 20. As is evident from FIG. 1, when latched in position, the safety bar 10 is seated at an angle in front of the cab door 17 across of and blocks the entryway to prevent movement of an operator into and out of the cab of the earth moving equipment.

Figure 2:
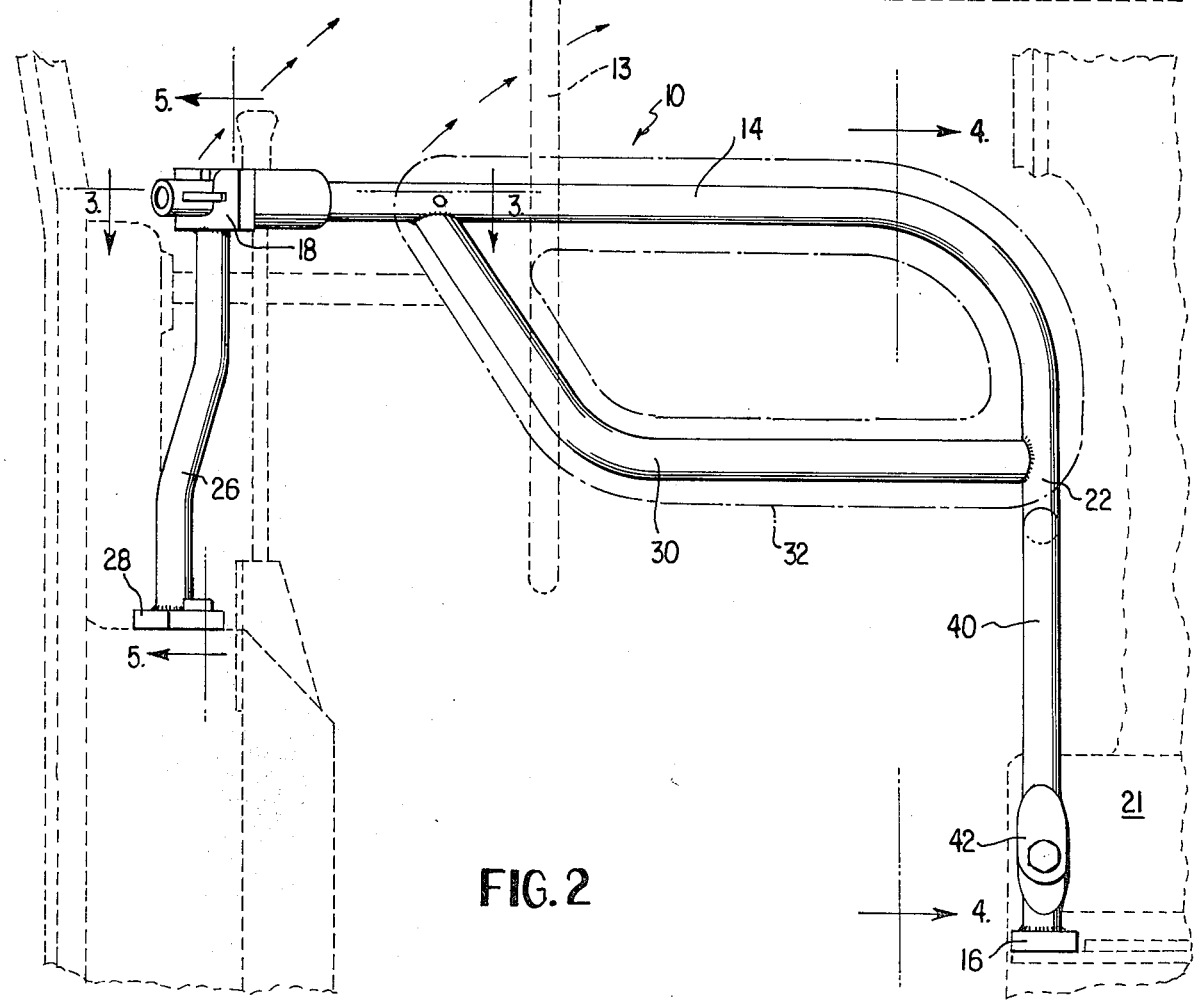
FIG. 2 is a side elevational view of the safety bar of FIG. 1 latched into the latch bar.

Safety bar 10 is shown in a side elevational view in FIG. 2. In FIG. 2, safety bar 10 is locked into position to block the entryway of the vehicle cab 12. Safety bar 10 comprises a horizontal member 14 and a vertical member 22 substantially perpendicular to the horizontal member 14 which is pivotally mounted on hinged plate 16 at base hinges 24. FIG. 2 discloses safety bar 10 locked into latch bar 18 and securing the safety bar into position to bar exit or entry from the entryway. As is evident, latch bar 18 is connected to a vertical latch bar support member 26 which in turn is secured to a latch bar base 28. Latch bar base 28 is bolted onto the floor to secure the latch bar support member in place.

The safety bar is rotatably connected to hinge plate 16 by hinges 24 and 42 to allow vertical freedom of rotation about hinges 24 and 42. The cab floor 21 is substantially clear of any upstanding structure to accommodate rotation of the vertical member 22 and reinforcing hinged bar 40 when the safety bar is out of the entryway of the cab.

Safety bar 10 has the horizontal member 14 and vertical member 22 connected by a reinforcing safety bar 30. Reinforcing safety bar 30 rigidifies the horizontal and vertical members and more effectively blocks the entryway of cab 12.

As shown by the phantom lines on safety bar 10 in FIG. 2, foam covering 32 coats the horizontal member 14, vertical members 22 and reinforcing safety bar 30 to provide a soft surface to enhance safety in the use of the safety bar 10.

A side cross-sectional view of safety latch 20 is shown in FIG. 3. Safety latch 20 is connected to horizontal member 14 of safety bar 10. Annular sleeve 36 is coaxially disposed about and remote from vertical member 22 of horizontal member 14. Safety lock 34 is axially connected to the end of annular sleeve 36 and holds the safety bar horizontal member 14 locked into the receiving slot 44 of latch bar 18 to bar the entryway. Spring 38 urges coaxially mounted sleeve 36 and the attached safety lock 34 to remain in the outward position to maintain the safety lock engaged in latch bar 18. Bolt 39 bridges horizontal member 14 and secures spring 38 against movement inside horizontal member 14 towards vertical member 22. The safety lock 34 and annular sleeve 36 can be easily telescopically retracted by the operator grabbing sleeve 36 and moving it axially along horizontal member 14. By telescopically retracting safety lock 34, the operator may disengage safety bar 10 from latch bar 18 and allow him to vertically rotate safety bar 10 to an open position and to allow use of the entryway of the cab.

When the safety latch 20 is engaging latch bar 18 and the safety bar 10 is in position, any movement through the cab entryway is prevented by horizontal member 14 and reinforcing safety bar 30 which effectively block the entryway. Thus, the presence of the safety bar will prevent any accidental movement out of the cab as may be caused by a falling operator who was standing by the control panel of the pitching earth mover or similar equipment equipped with the apparatus disclosed herein.

A frontal view of the safety bar 10 can be seen in FIG. 4. Vertical member 22 has a reinforcing hinged bar 40 attached by a solid connection on vertical member 22. Vertical member 22 is rotatably connected to base hinged plate 16 at a first base hinge 24 and reinforcing hinge bar 40 is connected to base hinge plate 16 at a second base hinge 42, said base hinges allowing for rotation of the safety bar 10 in a vertical plane which permits the horizontal member to block the entryway when lowered and leave the entryway unhindered when raised.

As will be seen in FIG. 4, protruding ears 24 and 25 are mounted on and extend upwardly from hinge plate 16. The lower end portions of members 22 and bar 20, ends 23 and 42 respectively, are flattened and are positioned in face to face contact with ears 24 and 25. The lower end portions and the ears are provided with openings therethrough to receive pivot pins in the form of bolts 25a and are held in place by appropriate nuts 25b.

FIG. 5 discloses a view of latch bar 18 taken along section lines 5—5 of FIG. 2. Latch bar 18 is seen as a bar having a safety latch receiving slot or recess 44 to receive safety lock 34 of safety bar 10 when put into a locked position. As seen in FIG. 5, horizontal member 14 has coaxially disposed sleeve 36 and safety lock 34 which can be telescopically moved by the operator to axially move safety lock 34 in a disengaging position on horizontal member 14. Safety lock receiving slot 44 has a lock slot 48 which accommodates the safety lock 34 when the safety gate is in a locked position preventing disengagement of the horizontal member 14 and the rotation of the safety bar 10 out of its closed position barring the entryway of the cab. As seen in FIG. 5, latch bar 18 is connected to latch bar support member 26 which is secured to the latch bar base 28 which can be bolted to the floor of the cab. Alternatively, latch bar 18 can be mounted on the dash of a piece of earth moving equipment.

FIG. 6 shows a view of the latch bar 18 taken along section lines 6—6 of FIG. 5. Latch bar 18 is fixedly connected to the end of latch bar support member 26 which is a closed pipe type member.

Although a certain specific embodiment of the invention has been shown and described, it is obvious that many modifications thereof are possible. The invention, therefore, is not intended to be limited to the exact showing and description thereof, but is considered to include reasonable and obvious equivalents.

What is claimed is:

1. A safety device for preventing inadvertent passage through the entryway of a vehicle comprising:
    a generally inverted L-shaped safety bar consisting of a horizontal means adapted to extend across said entryway, and a vertical means, said horizontal means being fixedly attached at one end thereof to an upper portion of said vertical means to provide an open area below said horizontal means;
    means for mounting a lower end of said vertical means to said vehicle for pivotal movement of said safety bar transverse to said entryway;
    said mounting means comprising vertically extending members having holes for cooperating with holes in said vertical means;
    wherein said vertical means comprises two spaced vertical elements, each of said vertical elements being mounted to one of said vertically extending members for pivotal movement; and
    means for latching said bar to retain it in a position across said entryway.

2. The safety device of claim 1 wherein the two vertical elements are parallel.

3. The safety device of claim 1 wherein said latching means includes a latch bar adapted to be attached to said vehicle and provided with a recess to receive said horizontal means.

4. The safety device of claim 3 wherein said latch bar extends transversely to said horizontal means and is mounted on an upright support adapted to be mounted on the vehicle.

5. The safety device of claim 3 wherein said latching means includes means on the horizontal means operatively associated with said recess to secure said horizontal member to said latch bar.

6. The safety device of claim 5 wherein said recess is provided with a lock slot and said latching means on the horizontal means comprises a retractable sleeve and a locking member extending transversely to said horizontal means adapted to be received by said lock slot, and a spring to bias said sleeve towards said latch bar.

7. The safety device of claim 1 wherein said horizontal means includes a reinforcing member.

8. A safety device for preventing inadvertent passage through the entryway of a vehicle comprising:

a generally inverted L-shaped safety bar consisting of a horizontal means adapted to extend across said entryway, and a vertical means, said horizontal means being fixedly attached at one end thereof to an upper portion of said vertical means to provide an open area below said horizontal means;

means for mounting a lower end of said vertical means to said vehicle for pivotal movement of said safety bar transverse to said entryway; and means for latching said bar to retain it in a position across said entryway;

wherein said latching means includes a latch bar adapted to be attached to said vehicle and provided with a recess, and means on the horizontal means operatively associated with said recess to secure said horizontal member to said latch bar; and wherein said recess is provided with a lock slot and said latching means on the horizontal means comprises a retractable sleeve and a locking member extending transversely to said horizontal means adapted to be received by said lock slot, and a spring to bias said sleeve towards said latch bar.

* * * * *